United States Patent [19]

Fukusima et al.

[11] Patent Number: 4,767,492
[45] Date of Patent: Aug. 30, 1988

[54] ULTRASONIC FUSE-BONDING SEALING APPARATUS WITH IMPROVED CONTACT SURFACES

[75] Inventors: Syoji Fukusima, Shizuoka; Motosaburo Kato, Yaizu; Takashi Mochizuki, Shimizu, all of Japan

[73] Assignee: Pola Chemical Industries, Inc., Shizuoka, Japan

[21] Appl. No.: 933,882

[22] Filed: Nov. 24, 1986

[30] Foreign Application Priority Data

Apr. 18, 1986 [JP] Japan .................................. 61-89515
Apr. 18, 1986 [JP] Japan .................................. 61-89516

[51] Int. Cl.$^4$ .............................................. B29C 65/08
[52] U.S. Cl. .................................. 156/580.2; 53/373; 156/73.1; 264/23; 425/174.2
[58] Field of Search ............... 156/73.1, 73.4, 73.5, 156/580, 580.1, 580.2; 264/23; 425/174.2; 53/373, 379; 493/189, 208

[56] References Cited

U.S. PATENT DOCUMENTS

| 2,679,469 | 5/1954 | Bedford ............................... 156/580 |
| 3,468,731 | 9/1969 | Obeda ................................ 156/73.1 |
| 3,844,869 | 10/1974 | Rust, Jr. ............................ 156/358 |
| 3,993,532 | 11/1976 | McDonald et al. ................ 156/580 |
| 4,572,753 | 2/1986 | Bach ................................... 156/73.1 |
| 4,681,645 | 7/1987 | Fukushima et al. ............... 156/73.1 |

FOREIGN PATENT DOCUMENTS

| 1279320 | 10/1968 | Fed. Rep. of Germany ..... 156/73.4 |
| 2832891 | 2/1980 | Fed. Rep. of Germany ........ 264/23 |
| 0141856 | 11/1979 | Japan ................................. 156/580.2 |
| 33424 | 2/1983 | Japan . |
| 205723 | 11/1983 | Japan . |
| 201928 | 10/1985 | Japan . |

Primary Examiner—Michael Wityshyn
Attorney, Agent, or Firm—Parkhurst & Oliff

[57] ABSTRACT

An ultrasonic sealing apparatus is disclosed wherein a pair of sheet-like members a bottom portion of a tubular member is fuse-bonded together by frictional heat generated by ultrasonic vibration. The apparatus includes horn (1) and anvil (2) means interposed with members to be fuse-bonded together. The horn and anvil provide contact surfaces (3) in contact with the members to be fused. Each of the contact surfaces is formed with a plurality of grooves (4) to provide a plurality of protrusions (5). Each of the protrusions has a flat upper surface and slanted side surfaces (6), so that the protrusion has a trapezodial cross-section. The horn means applies ultrasonic vibration to the fuse-bonding surfaces of the members to be fused in a direction oblique or parallel therewith in association with the anvil means.

6 Claims, 8 Drawing Sheets

FIG.2
FIG.5
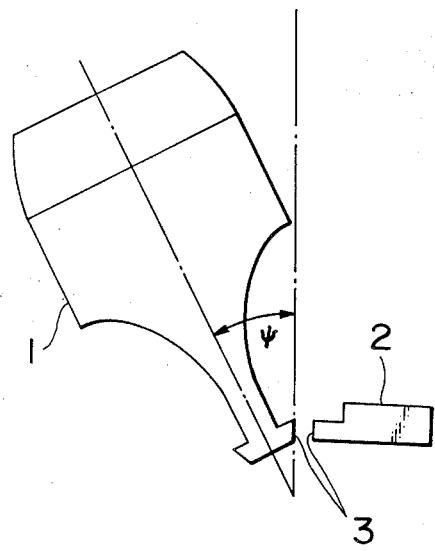
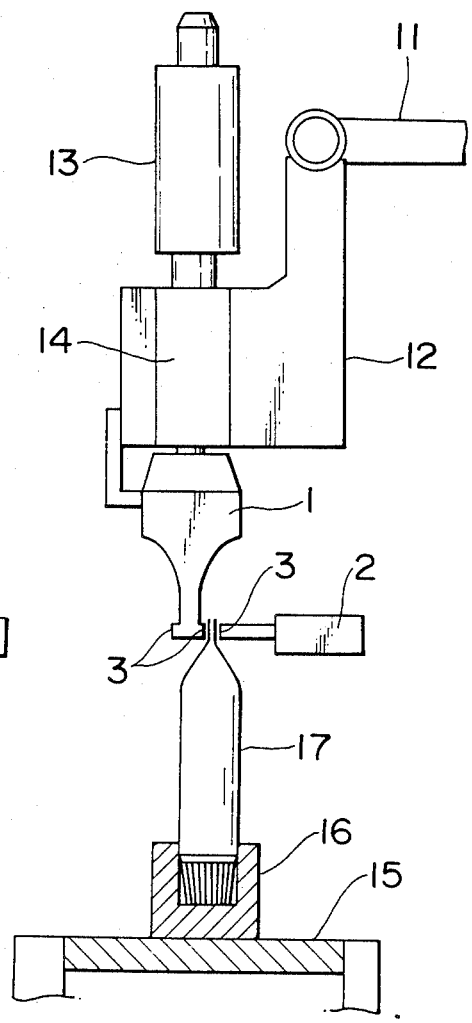

FIG. 9
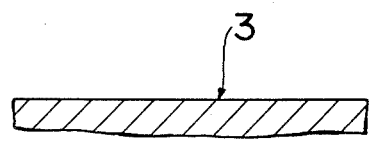
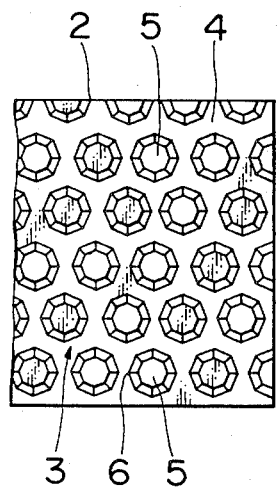
FIG. 10
FIG. 11A
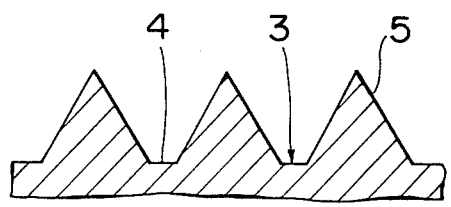
FIG. 11B
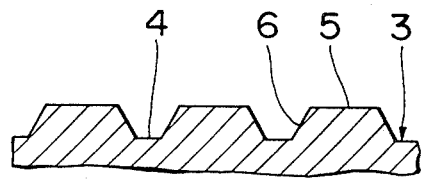
FIG. 11C
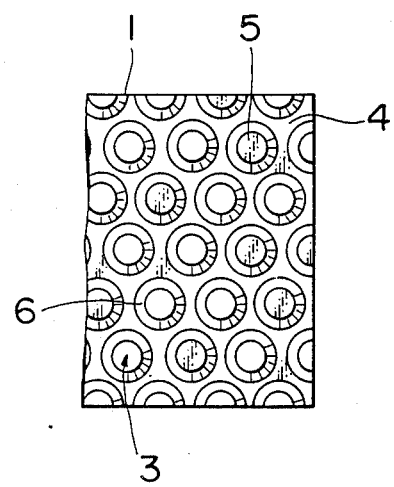

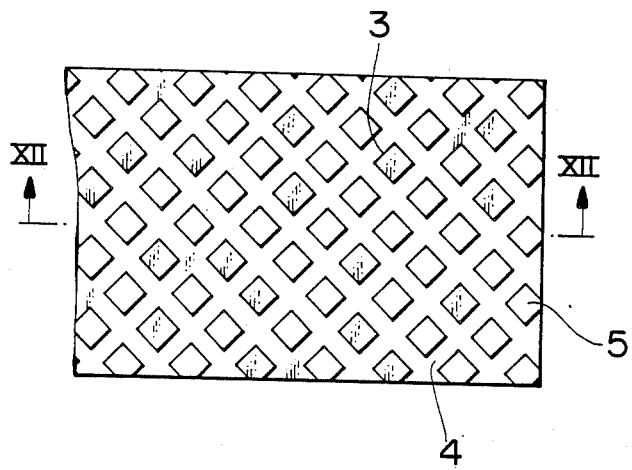
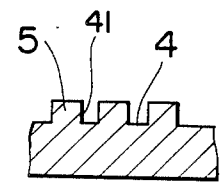
FIG. 12A PRIOR ART
FIG. 12B PRIOR ART
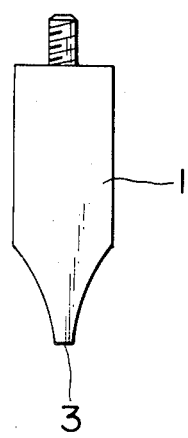
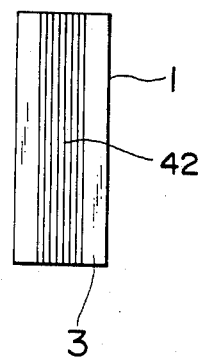
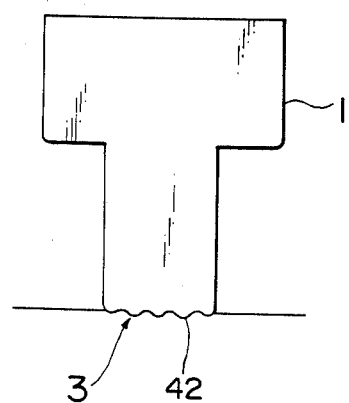
FIG. 13A PRIOR ART
FIG. 13B PRIOR ART
FIG. 13C PRIOR ART

ULTRASONIC FUSE-BONDING SEALING APPARATUS WITH IMPROVED CONTACT SURFACES

BACKGROUND OF THE INVENTION

This invention relates to an ultrasonic sealing apparatus for fuse-bonding sheet-like members formed of thermoplastic resin, and more particularly to an improvement of horn and anvil means in such apparatus capable of fuse-bonding opposing sheets with frictional heat generated by the ultrasonic vibration.

Various types of ultrasonic sealing apparatus have been known in which a pair of sheet-like members are fuse-bonded together by means of ultrasonic vibration. Firstly, a vertical vibration type sealing apparatus has been proposed in which ultrasonic vibration is applied to the fuse-bonding surface in a direction perpendicular thereto. According to this apparatus, lateral displacement of the sheet-like members relative to the horn and anvil means can be eliminated, since the fuse-bonding surfaces of the sheets are subject to the vibration in a direction perpendicular to the surfaces. Therefore, it is unnecessary to provide an embossing pattern on the sealing surfaces of the horn and anvil means for eliminating the lateral displacement. However, it is impossible to laterally remove or displace foreign materials adhered to the fuse-bonding surface of the sheets during vibration, due to the vibrating direction. Therefore, the vertical vibration type would not be available for fuse-bonding the bottom portion of a tubular container for containing cosmetics.

Secondly, lateral vibration type sealing apparatus have been proposed in which ultrasonic vibration is applied in a direction parallel to the fuse-bonding surfaces of the sheets. According to this type, foreign particles adhered to the fuse-bonding surfaces of the sheets can be removed in a lateral direction of the sheets because of the lateral vibration. However, lateral displacement of the sheets may occur with respect to the horn and anvil means due to the lateral vibration. This lateral displacement provides disadvantages in that ultrasonic vibration may not be efficiently transmitted to the fuse-bonded surfaces of the sheets, while the heat generation occurs at the horn means. Further, sufficient fuse-bonding may not be obtainable due to shortage of frictional heat during vibration, and furthermore, unpleasant high sound noise is generated due to the lateral displacement. Moreover, at the surfaces of the sheets in contact with the horn and anvil means partial hangnail or shaved-cut tips may be generated.

In order to obviate the above-described problems attendant to the lateral-vibration type sealing apparatus, an embossed pattern as shown in FIGS. 12A and 12B is formed on the surfaces of the horn and anvil means at portions in direct contact with the sheets. However, the embossed pattern shown in FIGS. 12A and 12B still did not provide a satisfactory result.

Thirdly, oblique vibration type sealing apparatus have been proposed in which ultrasonic vibration is applied to the fuse-bonding surfaces of the sheets in an oblique direction with respect to the surfaces as described in Japanese patent application provisional publication Nos. 58-33424 (1983), and 58-205723 (1983). According to this type, ultrasonic vibrations are dispersed into both vertical and lateral directions with respect to the fuse-bonding surface, so that the oblique type provides those advantages over vertical and lateral vibration type sealing apparatus. That is, in the oblique vibration type sealing apparatus, foreign materials adhered to the fuse-bonding surfaces of the sheets can be removed in a lateral direction of the sheets, and simultaneously lateral displacement of the sheets relative to the horn and anvil can be prevented to some extent. Therefore, fuse-bonding is achievable at higher-efficiency in the oblique type as compared to the vertical or lateral vibration type. Accordingly, the oblique vibration type sealing apparatus is also available for fuse-bonding at least two multiple layer sheets together, such bonding being insufficient in lateral vibration type apparatus.

However, lateral displacement of the sheets still cannot be completely eliminated in the latter type, and the displacement occurs despite formation of the embossed pattern as shown in FIGS. 12A and 12B at the contact surfaces of the horn and anvil. Therefore, further improvement on fuse-bonding has been required by way of highly efficient transmission of the ultrasonic vibration to the surfaces to be fuse-bonded.

Transmission efficiency of the ultrasonic vibration in the lateral or oblique vibration type sealing apparatus is determinative by the shape of projection pattern to be embossed at the horn and anvil surfaces which support the sheets. In this case, attention should be drawn to the following aspects:

(a) The horn and/or anvil should provide maximum area in contact with the fuse-bonding surfaces in a direction parallel therewith so as to generate maximum frictional heat at the fuse-bonding surfaces; and (b) The embossed pattern should provide sufficient thrust or bite with respect to the fuse-bonding surfaces so as to eliminate displacement of the latter relative to the horn and anvil.

Regarding aspect (a), maximum contact area in a direction parallel with the fuse-bonding surfaces is obtainable, if the embossed pattern is not formed on the horn and anvil. However, in the case lateral displacement of the sheets is excessively promoted. On the other hand, regarding aspect (b), the tip end of the projection pattern should be formed at an acute angle. However, in this case there is no contact area in a direction parallel with the fuse-bonding surfaces, to thereby degrade transmission of the ultrasonic vibration to the fuse-bonding surfaces, so that frictional heat is hardly generated. Apparently, these are contradictory requirements between the aspects (a) and (b).

As a matter of example, referring to the conventional embossed pattern shown in FIGS. 12A and 12B, projections 5 each having a rectangular flat contact face are defined by the formation of obliquely oriented diagonal grooves 4 intersecting with one another. The projections 5 have upright surfaces 41 directed perpendicular to the contact surface of the structure, each of the projections 5 does not easily bite into the fuse-bonding surfaces, so that lateral displacement of the sheets is not completely avoidable.

Further, U.S. Pat. No. 3,468,731 appears to show an embossed pattern having a construction similar to that shown in FIGS. 12A and 12B. In FIG. 4 of the U.S. patent, a knurled area is provided at a sealing surface. However, the knurling serves to increase the localized sealing pressure and simultaneously provides a most pleasing appearance of the sealed area (see column 3 lines 71 to 74 of the above-mentioned U.S. patent). Such structure also does not surely prevent the sheets from lateral displacement, as in the case shown in FIGS. 12A and 12B.

Furthermore, Japanese utility model application provisional publication 60-201928 (1985) shows a horn 1 in which a plurality of grooves and ridges 42 extend in a longitudinal direction of the contact surface as shown in FIGS. 13A to 13C herein. The grooves have constant depth along their length, and the ridges have contact height along their length with their tops being chamfered. As shown in FIG. 13C, the cross-sectional shape at the contact surface 3 of the horn is that of a continuous sinusoidal curve in the lateral direction of the contact surface 3. However, this publication pertains to a vertical vibration type ultrasonic sealing apparatus as is apparent from FIG. 13A in which the ultrasonic vibration direction is along the axial direction of the horn 1, and the contact surface 3 is formed at the distal end of the horn. For this it is understood that vibration is applied to the fuse-bonding surfaces of the sheets in a direction perpendicular thereto. Accordingly, these ridges 42 are not formed for the purpose of preventing the lateral displacement of the sheets, but are formed for the purpose of guiding resin melted by the frictional heat attendant ultrasonic vibration into the grooved area at the sealing portion, to thereby hold the molten resin in that area, to thus enhance fuse-bonding performance. Even if such structure shown in FIGS. 13A through 13C is applied to the lateral or oblique vibration type sealing apparatus, sufficient frictional heat may not be generated, since no contact surfaces directed parallel to the fuse-bonding surfaces are acknowledgeable in the ridge zone 42 having sinusoidal cross-section, and such ridge zone 42 may not sufficiently prevent the lateral displacement of the sheets due to insufficient biting of the ridge zone 42 into the fuse-bonding surfaces.

Conventional ultrasonic sealing apparatus still provides drawbacks from another vantage point. In case of sealing the bottom portion of a tubular member by the employment of the conventional apparatus, a clamp means 20 (so called "Jaw") is required as shown in FIGS. 14-16 for clamping a container 17 prior to clamping the bottom portion of the container 17 by a horn and an anvil. The clamp means 20 includes a frame member 21 in which a slide member 22 is slidably disposed. The slide member 22 is urged by a spring 23 so as to clamp a bottom of a container 17 by the frame member 21 and the slide member 22 with the aid of biasing force of the spring 23. A pair of guide plates 24 extend obliquely and downwardly from the bottom portions of the frame 21 and the slide member 22, so that cylindrical tubular container 17 is introduced into a space defined between the frame 21 and the slider 22 to be flattened by the guide plates 24.

The above-described clamp means 20 is required so as to hold the members to be fuse-bonded, since complete fuse-bonding may not be carried out in the conventional sealing apparatus. Such clamp means 20 therefore serves as a supplement to complete fuse-bonding. Further the clamp means 20 also prevents molten resin generated at fuse-bonding surfaces during ultrasonic vibration from entering inside the tubular container 17, since the clamp means 20 clamps the bottom portion of the container at the position below the fuse-bonding surfaces (see FIG. 14).

On the contrary, the disposal of the clamp means 20 leads to other disadvantage.

Firstly, molten resin is accumulated between a space defined between a portion clamped by the clamp means 20 and a portion clamped by the horn 1 and anvil 2 (see FIG. 14). Therefore, a bulged portion 25 is disadvantageously provided at this space as shown in FIGS. 17A and 17B, to thereby degrade external appearance.

Secondly, such clamp means complicates the production line. To be more specific, the conventional sealing apparatus as shown in FIG. 14 includes the clamp means 20, a feed-in conveyor 31 adapted to transfer non-fuse-bonded tubular container 17, a turntable 32 adapted to mount a plurality of the clamp means 20 at its outer peripheral end portion, a horn 1 and anvil 2 those positioned at one side of the turntable 32, and a feed-out conveyor 33 adapted to take-up a tubular container subjected to fuse-bonding by the horn 1 and the anvil 2. Container holders 34 are respectively provided on these feed-in and feed-out conveyors 31 and 33 so as to supply the container 17 to the clamp means 20 or receive the container therefrom. Each of the holders 34 also provides includes a liftable mechanism for that purpose.

If the clamp means 20 is eliminated, the container holder 34 having liftable mechanism and the turn-table 32 can also be eliminated, and further, a single conveyor can perform both feed-in and feed-out functions. As a result, a compact and simplified production line may be provided if the clamp means 20 can be eliminated.

SUMMARY OF THE INVENTION

The present invention has been developed in order to remove the above-described drawbacks inherent in the conventional sealing apparatus.

It is, therefore, an object of the present invention to provide new and useful ultrasonic vibration sealing apparatus of lateral or oblique vibration types.

Another object of the present invention is to provide such apparatus capable of providing effective transmission of ultrasonic vibration to the sheets to be fuse-bonded so as to obtain firm and stabilized fuse-bonding.

Still another object of this invention is to provide such apparatus capable of providing sufficient contact area in a direction parallel with the fuse-bonding surfaces of the sheet, yet providing sufficient biting of the contact area into the sheets.

Still another object of the invention is to provide such apparatus capable of eliminating clamp means which conventionally supplements fuse-bonding, to thereby provide a resultant apparatus with a simple and compact construction.

These and other objects of the present invention will be obtained by an improvement of projection pattern formed in a horn and/or an anvil provided in the above-mentioned lateral or oblique vibration type sealing apparatus. Throughout various R & D, the present inventors have found that effective fuse-bonding is only achievable by the lateral or oblique vibration type apparatus by providing the shape of the projection pattern as shown in FIG. 11C, which is the intermediary configuration between those shown in FIG. 11A and FIG. 11B, in order to obtain, at the horn and anvil, sufficient contact area in a direction parallel with the fuse-bonding surfaces of the sheet, yet providing sufficient thrust or bite of the projections into the sheets. FIG. 11A shows the configuration wherein larger parallel areas results in elimination of the projections, and FIG. 11B shows the configuration wherein the largest biting of the projections results from projections with sharp tips.

The intermediary arrangement shown in FIG. 11C provides both respective advantages derived from FIGS. 11A and 11B.

Further, elimination of the clamp means is attained in the present invention by providing sufficient fuse-bonding of the sheets because of the improvement of embossed or projection pattern at the contact surface of the horn and anvil. If the fuse-bonding strength is improved, it is unnecessary to further clamp the member to be sealed by the clamp means. This requirement can also be attained by the improved projection pattern. Therefore, the above-mentioned technical objects can be simultaneously solved by the improvement of the projection pattern at the surface of the horn and anvil.

According to the present invention, in the lateral or oblique vibration type ultrasonic sealing apparatus in which a pair of sheet-like members are clamped by a horn and an anvil, and clamped sheets are fuse-bonded together by frictional heat caused by the ultrasonic vibration, the horn and anvil surfaces in contact with the pair of sheets are formed with a novel projection pattern.

The pattern is characterized by the shape of the projection defined by a flat upper surface and slanted side surfaces. Therefore, each of the projections has a trapezoidal cross-section. Such projections can be provided by forming grooves on the contact surface, the grooves having trapezoidal cross-section.

These trapezoidal projections can easily bite into the sheets, to thereby prevent the sheets from lateral displacement, to thus generate friction heat at high efficiency because of stabilized transmission of ultrasonic vibration to the fuse-bonding surfaces. As a result, firm and stable fuse-bonding is achievable.

Accordingly, multiple layer sheets and also be fuse-bonded together, a feat considered to be impossible by the conventional ultrasonic fuse-bonding apparatus. In particular, this invention is also available for fuse-bonding the multiple sheets which interpose therebetween a sheet of ethylene-vinyl alcohol copolymers, such as that known as "EVAL" (trademark), as an intermediate layer.

Further, in the present invention, heat generation at the horn can be reduced, since the ultrasonic vibration is transmitted to the sheets at no loss, so that cooling of the horn is not severely required, and high-speed fuse-bonding is continuously achievable.

Furthermore, unpleasant noise can be reduced because of the reduction of lateral displacement of the members to be sealed, so that a satisfactory working condition is realized.

Furthermore, because of the elimination of the lateral displacement, no peeling or shaved-off tips are generated at the sheet-like surfaces clamped by the horn and the anvil, so that the resultant product has excellent external appearance.

Furthermore, the projections have trapezoidal cross-sections, so that undesirable sticking of the sheet-like member to the horn and anvil can be reduced to a minimum level. Therefore, the sheets thrust by the projections can easily be removed from the projection pattern, upon completion of fuse-bonding. As a result, no cutting of the sheets occurs during peeling.

Futhermore, conventionally, various types of sealing apparatus should selectively be used, such as heat-seal, high frequency seal, and ultrasonic seal apparatus, in conformance with various types of materials of the members to be sealed. On the other hand, the present invention can eliminate such selection because of the employment of the horn and the anvil in accordance with the present invention, and can perform desirable sealing or fuse-bonding by the single ultrasonic sealing apparatus regardless of the variation of the materials of the sealed member.

The present invention is also available for fuse-bonding the bottom of a container formed of thermoplastic resin. That is, the horn and the anvil according to the present invention clamp the container bottom, and perform fuse-bonding at this portion with frictional heat caused by ultrasonic vibration. The projections formed on the horn and anvil surfaces in contact with the container bottom are of trapezoidal shape in cross-section, in which flat top face and slanted side faces define the trapezoidal shape, so that the container bottom can be positioned between the horn and the anvil when these are opened.

Therefore, additional clamping means can be eliminated to thereby simplify the entire apparatus.

In accordance with the present invention, there is provided an ultrasonic sealing apparatus for fuse-bonding together a pair of sheet-like members by frictional heat generated by ultrasonic vibration comprising: horn means having a contact surface in contact with one of the sheet-like members; and anvil means having a contact surface in contact with the other sheet-like member, the anvil means being in confrontation with the horn means, the contact surfaces of the horn and anvil means being formed with grooves to provide a plurality of protrusions, each of the protrusions having a flat upper surface and slanted side surfaces, so that each of the protrusions has a trapezoidal shape in cross-section.

In accordance with the present invention, there also is provided a ultrasonic sealing apparatus for fuse-bonding a bottom portion of a tubular container formed of thermoplastic resin, the fuse-bonding being performed by frictional heat generated by ultrasonic vibration, comprising: horn means having a contact surface in contact with the bottom portion; anvil means having a contact surface in contact with the bottom portion, the bottom portion being held between the horn and anvil means, and a position of the anvil means being displaceable relative to the horn means, the contact surfaces of the horn and anvil means being formed with grooves to provide a plurality of protrusions, each of the protrusions having a flat upper surface and slanted side surfaces so that each of the protrusions has a trapezoidal shape in cross-section; and conveyor means adapted to position the bottom portion betwen the horn and anvil means when these are opened.

BRIEF DESCRIPTION OF THE DRAWINGS

The object and features of the present invention will become more readily apparent from the following detailed description of the preferred embodiments taken in conjunction with the accompanying drawings in which:

FIG. 2 is a front view showing a horn and an anvil used in an oblique vibration type ultrasonic sealing apparatus according to this invention;

FIG. 5 is a front view showing a lateral vibration type ultrasonic sealing apparatus according to the invention;

FIGS. 7 to 10 are views showing projection patterns according to other embodiments and the invention;

FIGS. 11A–11C are explanatory cross-sectional views showing a concept of the configuration of the projections according to the invention;

FIG. 12A is a view showing a conventional projection pattern;

FIG. 12B is a cross-sectional view taken along the line XII—XII of FIG. 12A;

FIGS. 13A to 13C show another example of a conventional horn and its surface in contact with a member to be fuse-bonded;

The same or corresponding parts and elements are designated at like reference numerals throughout the drawings.

DESCRIPTION OF THE PREFERRED EMBODIMENTS

The present invention will be described with reference to the accompanying drawings.

Figure 1A:
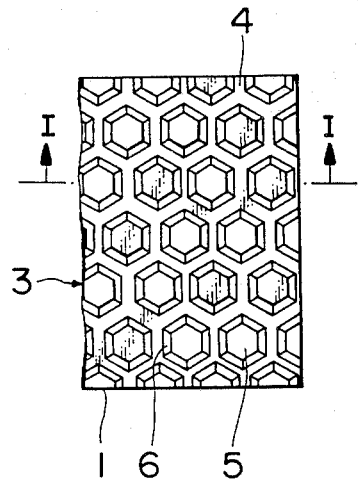
FIG. 1A is a front view showing a projection pattern formed on a horn according to a first embodiment of the present invention.
Figure 1B:
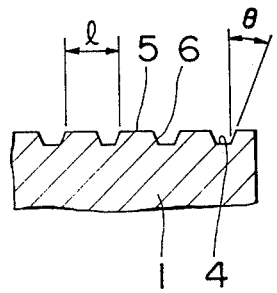
FIG. 1B is a cross-sectional view taken along a line I—I of FIG. 1A.

Referring first to FIGS. 1A and 1B, shown is a projection pattern formed on respective contact surfaces 3 of a horn 1 and an anvil 2. As shown in FIG. 1B, protrusions 5 are provided by forming grooves 4 on the surface of the horn 1. Each of the protrusions 5 has slanted surfaces 6 directed at an angle $\theta$ with respect to the line normal to the contact surface 3. The angle $\theta$ is in a range of from 5° to 45°, and preferably from 10° to 30°, the angle being determined in this range in accordance with the material of the sheets to be fuse-bonded.

Figure 7:
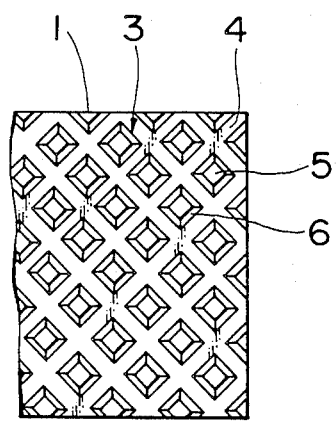
Figure 8:
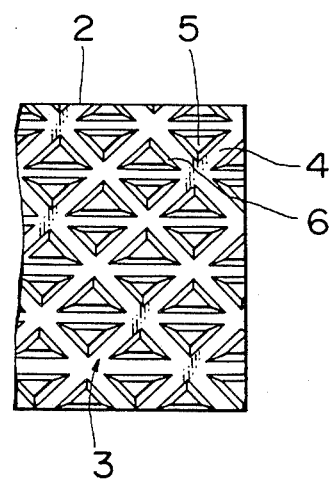
Figure 14:
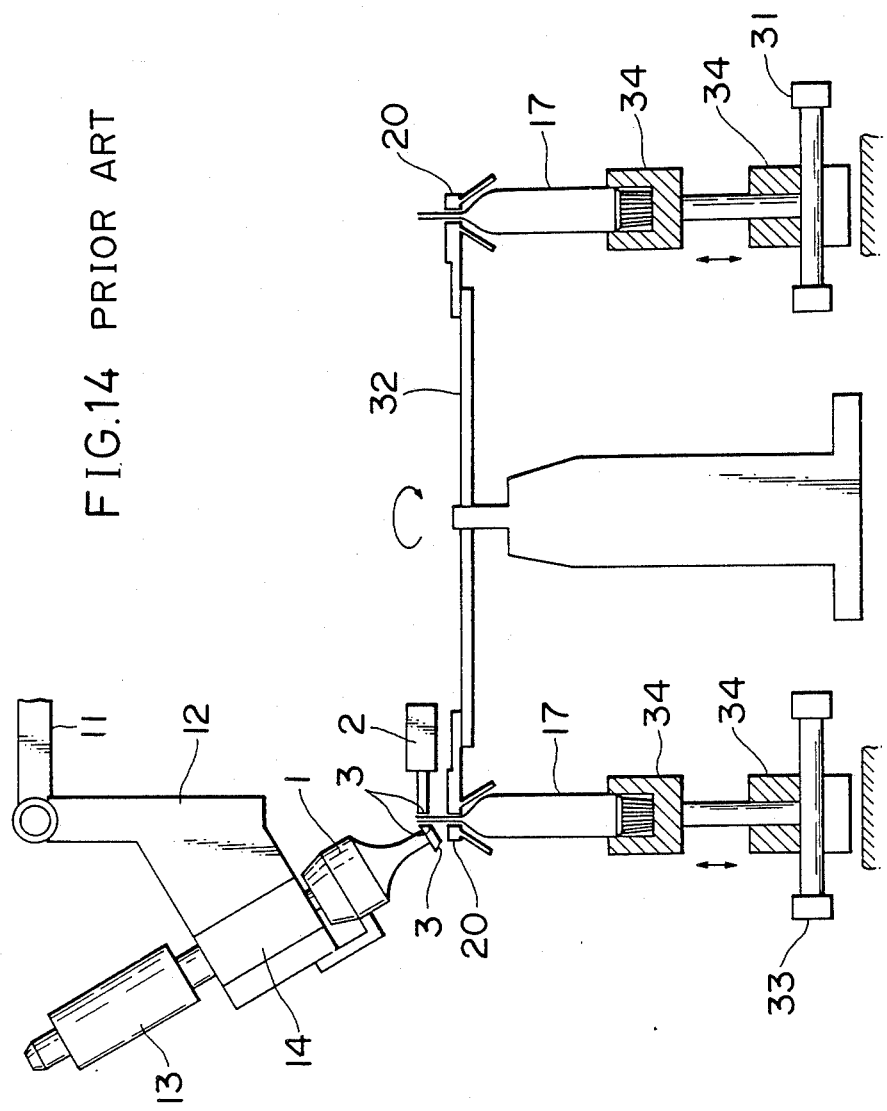
FIG. 14 is a front view showing a conventional oblique vibration type ultrasonic sealing apparatus.
Figure 15:
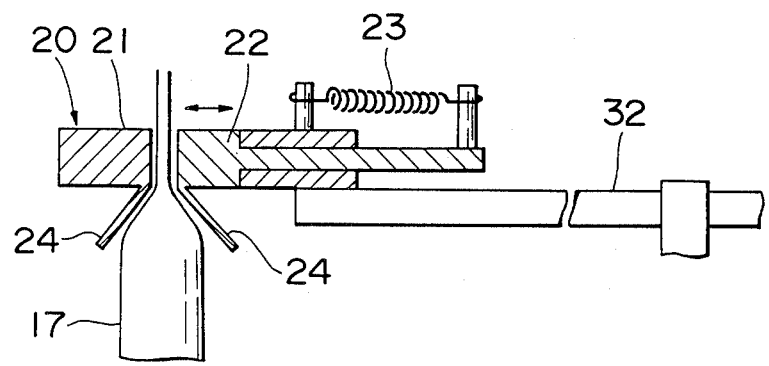
FIG. 15 is a view partly in cross-section showing a clamp means used in the conventional apparatus of FIG. 14.
Figure 16:
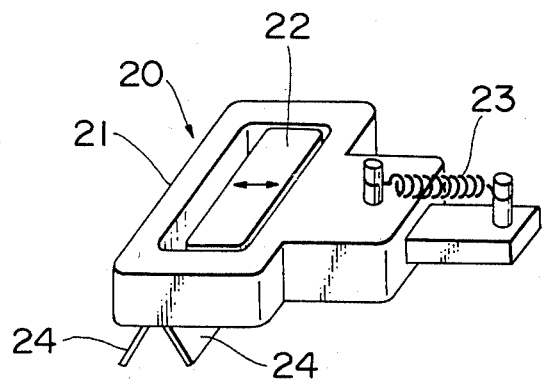
FIG. 16 is a perspective view showing the clamp means.
Figure 17A:
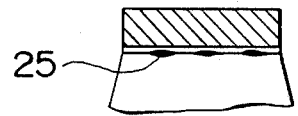
FIGS. 17A and 17B show undesirable sealing provided by the embodiment of the clamp means shown in FIGS. 15 and 16.
Figure 17B:
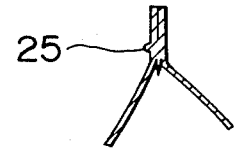

The grooves 4 extend linearly and are intersected with one another. Alternatively, the grooves 4 may be bent or meandered. According to the former case, protrusions 5 having rectangular or triangular shape can be formed as a continuous pattern as shown in FIGS. 7 and 8. In the latter case, a zig-zag or corrugated projection pattern is formed on the horn or anvil surface. Alternatively, hexagonal protrusions 5 (FIG. 1A), octagonal protrusions 5 (FIG. 9) or circular projections 5 (FIG. 10) are continuously formed.

Pattern pitch 1 as shown in FIG. 1B, defined by a distance between one end of a protrusion 5 and a like end of a neighbouring projection 5, is in a range of from 0.5 to 2.0 mm, and preferably 0.8 to 1.6 mm. This range is determined on the basis of requirements such as maximization of frictional heat generation, minimization of sealing period, and the required least pressing force attained by the horn 1 and the anvil 2. Incidentally, size and shape of the protrusions at the horn 1 can be different from those at the anvil 2.

Further, it is necessary to maintain planes parallel to the fuse-bonding surface in order to provide sufficient frictional force. For example, in the case of a honeycomb type pattern as shown in FIG. 1A, the ratio of the area of the grooves 4 to the upper surface area of the projections is in a range of from 30:70 to 64:36, and preferably approximately 40:60.

With respect to the depth of grooves 4 which provide protrusions 5, if the depth is too large the case of fuse-bonding the thermoplastic sheets together, protrusions 5 excessively advance into the sheets to thereby reduce the thickness of the sheets at their fuse bonding portions, so that the sheets may be penetrated by the protrusions at the portions. Further, volume of the grooves becomes large to excessively allow molten resin to flow into the grooves. Upon solidification of such resin, external appearance at the sealing portion is degraded. On the other hand, if the grooves 4 are too shallow, sheet lateral displacement may occur relative to the horn and anvil due to insufficient thrust of the protrusions 5 into the sheets. As a result, frictional heat generating efficiency may be lowered at the fuse-bonding surface. Therefore, depth of the grooves should be in a range of from 35 to 65% of the thickness of one of the sheets, and preferably from 40 to 60%. The depth of the grooves at the horn 1 should not necessarily be the same as that of the grooves at the anvil 2, but the depths can be different from each other.

The sheet-like members to be fuse-bonded by the ultrasonic sealing apparatus according to the invention are selected from the group of thermoplastic resin single layer sheet, thermoplastic resin multi-layer sheets, or other multi-layer sheets consisting of a thermoplastic resin layer and a sheet formed of paper or aluminum (those not being formed of thermoplastic resin). Such members are available for fuse-bonding bottoms of tubular containers for containing therein a cosmetic or toothpaste.

Regarding multi-layer sheets formed of thermoplastic resin which are applied to the tubular container, the container has inner and outer layers formed of high density polyethylene (HDPE), and low density polyethylene (LDPE), respectively. Alternatively, an intermediate resin layer having gas barrier properties such as "EVAL" (trademark) and nylon is interposed between HDPE and LDPE.

Regarding multi-layer sheets formed of different kinds of materials, an aluminum lamination layer is interposed between the inner and outer layers.

Figure 4A:
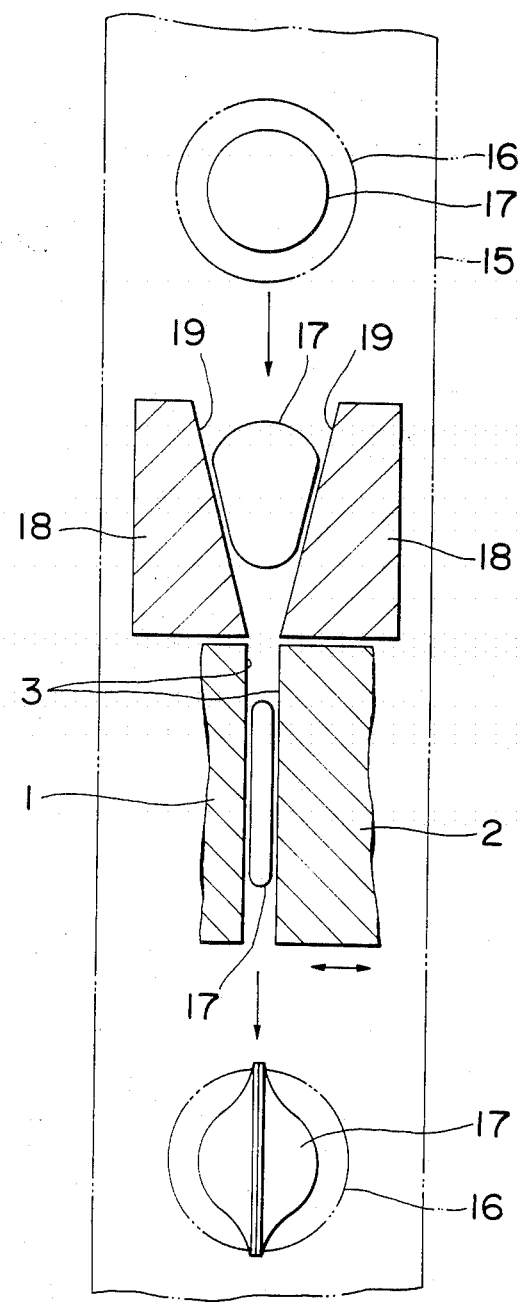
FIG. 4A is a schematic view showing a process for sealing a bottom portion of a tubular container.
Figure 4B:
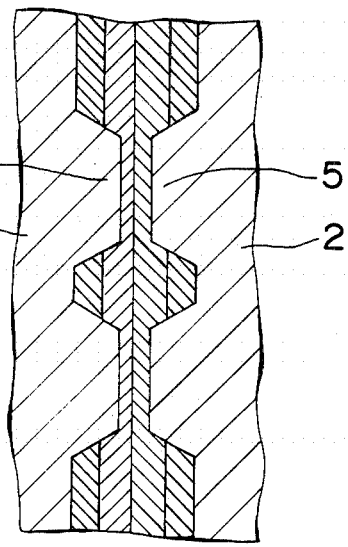
FIG. 4B is a cross-sectional view showing biting or thrusting of the projections into fuse-bonding sheets.
Figure 6:
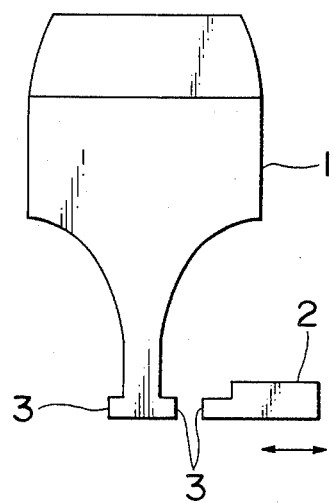
FIG. 6 is a front view showing a horn and anvil used in the apparatus shown in FIG. 5.

According to the present invention, since the side surfaces 6 of the protrusions 5 are slanted in the contacting surfaces of the horn 1 and the anvil 2, the protrusions 5 readily bite into the sheet-like members. Particularly, in the case of fuse-bonding multi-layer sheets together, protrusions 5 can thrust into the inner layer of the fuse-bonding surfaces as shown in FIG. 4A, by the optimum selection of height of the protrusions 5, i.e. depth of the grooves 4, since the protrusions 5 of the invention can deeply thrust into the sheets. As a result, ultrasonic vibration is sufficiently transmitted to the fuse-bonding surfaces for generation of frictional heat at high efficiency. If the protrusions 5 do not completely penetrate the outer layer, the ultrasonic vibration is not directly transmitted to the inner layer, but is transmitted thereto by way of the outer layer. During this transmission from the outer to inner layers, the ultrasonic vibration is attenuated, and therefore sufficient frictional heat generation may not be attainable. In particular, in the case of fuse-bonding the bottom of a multi-layer tube which includes a layer of "EVAL" (trademark) between inner and outer layers formed of polyethylene, fuse-bonding may not be sufficiently achievable by the conventional apparatus whose protrusions do not bite into the inner layers, since the polyethylene layer is not adhered to the "EVAL" layer due to their resin properties. On the other hand, according to the present invention, desirable fuse-bonding results, since protrusions 5 can bite into the inner layers of the opposing sheets.

Further, since each of the grooves 4 has trapezoidal cross-section, the sheet members penetrating into the grooves 4 can be easily peeled from the protrusion pattern. That is, the cross-sectional area of the tip end of the protrusion is smaller than that of the bottom portion thereof. Conversely the cross-sectional area of the groove bottom is smaller than that of the groove top.

Furthermore, in case the grooves 4 do not have a straight line pattern but have a bending pattern, resin melted by the ultrasonic vibration is uniformly distributed along the bending grooves 4. Therefore, uniform fuse-bonding is achievable along the fuse-bonding area, and stabilized and firm bonding results. This effect is particularly acknowledgable in the case of the honeycomb protrusion pattern shown in FIG. 1A. On the contrary, in the case of the projection pattern having a straight groove pattern, molten resin may flow in a one way direction. Fuse-bonding is obtainable more uniformly in the case of the bending groove pattern (FIGS. 1, 9 and 10) rather than the straight groove pattern (FIGS. 7 and 8).

Moreover, in the invention top surfaces of the protrusions are directed parallel to the fuse-bonding surfaces, so that sufficient frictional heat can be provided.

Furthermore, an oblique vibration type sealing apparatus is used in which ultrasonic vibration is applied to the sheets in a direction oblique to the fuse-bonding surfaces so as to fuse-bond the bottom of the tubular container, even if material filled in the container adheres to the fuse-bonding surfaces, the adhered material can be splashed out of the fuse-bonding surface. In the present invention, such splashing is effectively performed because of the employment of a specific projection shape having slanted side faces 6 at the contact surfaces 3 of the horn 1 and the anvil 2, since lateral displacement can be reduced. Accordingly, fuse-bonding is achievable with interposing cosmetic material between the fuse-bonding surfaces, and further, sufficient sealing at the container bottom is achievable even if the container is filled with cosmetic liquid.

Next, a sealing apparatus according to the invention will be described.

Figure 3:
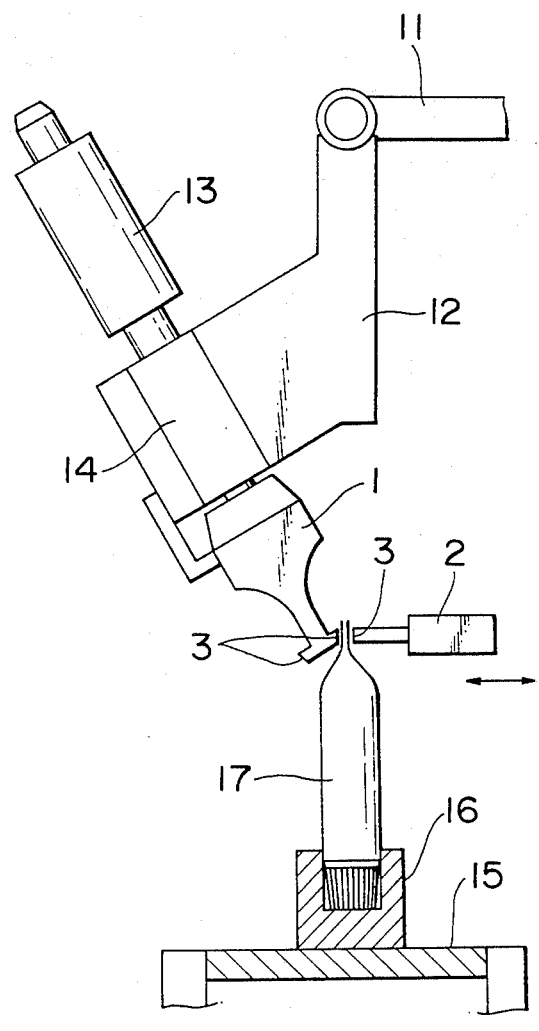
FIG. 3 is a front view showing the oblique vibration type ultrasonic sealing apparatus according to the invention.

Referring first to an oblique vibration type ultrasonic sealing apparatus, as shown in FIG. 3, a support arm 12 is provided rotatable about a tip end of a supporting stem 11. On the support arm 12, an oscillator 13, an amplifier 14 and a horn 1 are coaxially mounted. Ultrasonic vibration is directed in the axial direction of the oscillator, amplifier and the horn. The horn 1 has a tip end portion, both sides of which are formed with a pair of contact surfaces 3. Each contact surface 3 is oriented at an angle of from 5° to 40° with respect to the axial direction of the horn 1. Preferably, the angle is approximately 20°.

An anvil 2 is disposed adjacent to the horn 1. The horn 1 and the anvil 2 are retractably provided so as to control the distance therebetween. Alternatively, the horn 1 is stationary whereas the anvil 2 is retractable. Conversely, the anvil 2 is stationary while the horn 1 is retractable provided so as to control the distance. The best mode resides in the retraction and extension of the anvil 2 in terms of mechanical simplification. For this, a hydraulic cylinder is used to drive the anvil 2. Further, horn 1 should be fixedly secured to the arm 12 in such a manner that the contact surfaces 3 of the horn extend vertically.

The anvil 2 can be retractably disposed in such a manner that the contact surface 3 of the anvil 2 is spaced away from the contact surface 3 of the horn 1 so as to make the distance therebetween larger than a diameter of the largest tubular container 17, when the anvil 2 is at the retracted position. However, in light of the positional adjustment during the fuse-bonding operation, the distance should be smaller than the diameter of the tubular container 17. Preferably, the distance should be from 5 to 15 mm.

If the distance between the contact surfaces 3 of the horn 1 and the anvil 2 is larger than the diameter of the tubular container 17, the container 17 is brought into a position between the horn 1 and the anvil 2, and is held there for fuse-bonding. On the other hand, if the distance is smaller than the diameter of the tubular container 17, guide members 18 are required at the respective sides of the horn 1 and the anvil 2 so as to allow the container 17 to enter a space between the horn and the anvil with accompanying deflection of the container as shown in FIG. 4A. The guide members 18 are provided with guide surfaces 19 having tapered or convex configurations for flattening the container end.

With this structure, the tubular container 17 is introduced into the space defined between the horn 1 and the anvil 2 through the guide members 18, and the container is temporarily stopped for fuse bonding. Upon completion of the bonding, a conveyor 15 positioned below the horn 1 and the anvil 2 receives and feeds out the thus bonded container 17 as shown in FIG. 4A. The conveyor 15 is adapted to feed the container 17 into and out of the horn and the anvil, from one side thereof to the other. Therefore, the conveyor 15 may be installed so as to have a linear travel. Further, holders 16 are mounted on the conveyor 15 equidistance from one another for inversely supporting the tubular containers 17.

Turning to a lateral vibration type ultrasonic sealing apparatus wherein ultrasonic vibration is applied in a direction parallel to the fuse-bonding surfaces (FIG. 5), an oscillator 13, an amplifier 14 and a horn 1 are coaxially and vertically supported by a support arm 12. Further, the horn 1 has contact surfaces 3 at both sides thereof which extend parallel with the vertical axis. Remaining components are identical with those described with reference to the oblique vibration type. Ultrasonic vibration directed in the axial direction of the horn 1 is applied parallel to the fuse-bonding surface of the tubular container 17 through the contact surface 3.

According to the present invention, sealing at the bottom of the tubular container is sufficiently conducted in comparison with the conventional apparatus because of the improvement in the protrusion pattern formed on the contact surfaces of the horn and the anvil. Therefore, clamp means required in the conventional apparatus can be eliminated, to thus simplify the resultant system construction and sealing process. Further, it becomes unnecessary to provide a lifting mechanism to the holder for elevating and lowering the holder which supports the container. Therefore, the resultant apparatus can be provided at reduced cost and the apparatus can be installed in a smaller space.

Table 1 below shows sealing strength at the bottoms of the tubular containers formed of various types of materials, employing oblique and lateral vibration type ultrasonic sealing apparatus. In this case, a horn and anvil were used having a honeycomb projection pattern (FIGS. 1A and 1B) formed at the contact surfaces 3. As a matter of comparison, another horn and anvil were prepared each having a conventional rectangular projection pattern (FIG. 12) at the contact surfaces thereof. Pattern pitch 1 was 1.1 mm, and the area ratio of grooves 4 to the upper flat surfaces of the projections 5 was 41:59, and the groove depth was 0.2 mm. Side faces of each of the projections were directed at an angle of 20° with respect to the plane directed normal to the contact surfaces in the case of the honeycomb type projection pattern.

Ultrasonic vibration frequency was 20 kHz with an output of 1.8 kW.

TABLE 1

| Materials of Tubular Container Outer - Fuse-bond Surface (Thickness μm) | (Sealing Condition) | | | |
|---|---|---|---|---|
| | Oblique Vibration | | Lateral Vibration | |
| | Honey-comb (FIG. 1) | Rectangular (FIG. 12) Prior Art | Honey-comb (FIG. 1) | Rectangular (FIG. 12) Prior Art |
| LDPE (Single Layer) (360) | Excellent | Excellent | Good | Poor |
| MDPE (Single Layer) (400) | Excellent | Excellent | Good | Poor |
| LDPE/nylon/Multi-layer PP (170)/(60)/(170) | Excellent | Poor | Poor | Poor |
| LDPE/HDPE (150)/(300) | Excellent | Poor | Poor | Poor |
| LDPE/"EVAL"/MDPE (170)/(60)/(170) | Excellent | Poor | Poor | Poor |
| LDPE/LDPE/AL/PE/LDPE (250)/(90)/(12)/(12)/(80) | Excellent | Excellent | Good | Good |
| LDPE/AL/LDPE/paper/LDPE (200)/(12)/(90)/(20)/(80) | Excellent | Excellent | Good | Good |
| LDPE/LDPE (Dual Tube) (380)/(380) | Excellent | Poor | Poor | Poor |

Note:
LDPE: low density polyethylene
MDPE: medium density polyethylene
HDPE: high density polyethylene
PP: polypropylene
AL: aluminum As is apparent from Table 1, sufficient seal was attained in the case of the honeycomb protrusion pattern in comparison with the conventional type. In particular, quite excellent sealings were acknowledged in the case of the honeycomb type used in the oblique vibration type ultrasonic sealing apparatus. Further, since side faces of the projections are slanted, sufficient biting of the protrusion into the sheets resulted, and unpleasant frictional noise occurred at a reduced level, and tubes were easily peeled from the projected pattern after sealing.

Further experiments were conducted to investigate advantages obtainable by the employment of the honeycomb projection pattern using the oblique vibration type ultrasonic sealing apparatus. The test results are shown in Table 2.

TABLE 2

| Material of Tubular Container Outer - Fuse-bonding Surface | Tube Diameter (mm) | Anvil Pressure (kg/cm$^2$) | Fuse-bonding (second) | Sealing Strength (kg) |
|---|---|---|---|---|
| LDPE (Single Layer) | 22 | 8 | 0.35 | 100 |
| MDPE (Single Layer) | 22 | 8 | 0.35 | 100 |
| LDPE/nylon/PP (Multi-layers) | 25 | 10 | 0.58 | 78 |
| LDPE/HDPE | 25 | 10 | 0.56 | 100 |
| LDPE/"EVAL"/MDPE | 25 | 10 | 0.55 | 93 |
| LDPE/LDPE/AL/PE/LDPE | 30 | 8 | 0.58 | 100 |
| LDPE/AL/LDPE/paper/LDPE | 30 | 8 | 0.60 | 100 |
| LDPE/LDPE (Dual Tube) | 40 | 14 | 0.55 | 100 |

Sealing strength was measured using a tensile-compression tester in which pressure speed was 100 mm/min, and pressure applying surface area had a diameter of 60 mm.

As is apparent from Table 2, fuse-bonding can be performed in a short period of time, and high sealing strength is obtainable when combining the oblique-type vibration ultrasonic sealing apparatus with the honeycomb protrusions 5. The present invention thus realizes stable and firm bonding regardless of the employment of the clamp means.

The above-described embodiments are just examples of the present invention, and therefore it will be apparent to those skilled in the art that many modifications and variations may be made without departing from the scope of the present invention.

What is claimed is:

1. An ultrasonic sealing apparatus, for fuse-bonding together a pair of sheet-like members by frictional heat generated by ultrasonic vibration, comprising:
    (a) horn means, having a contact surface in contact with one of said sheet-like members; and
    (b) anvil means, having a contact surface in contact with the other sheet-like member;
    said anvil means being in confrontation with said horn means, said contact surfaces of said horn and anvil means being formed with grooves to provide a plurality of protrusions, said grooves providing a bending pattern, each of said protrusions having a flat upper surface and slanted side surfaces so that each of said protrusions has a trapezoidal shape in cross-section, said protrusions being arranged such that said grooves extend from one end to the other end of each of said contact surfaces in zig-zag fashion, said flat upper surfaces of said protrusions being of honeycomb configuration, said pair of sheets having fuse-bonding surfaces and at least one of said horn and anvil means providing ultrasonic vibration in a direction oblique to said fuse-bonding surfaces.

2. An ultrasonic sealing apparatus, for fuse-bonding together a pair of sheet-like members by frictional heat generated by ultrasonic vibration, comprising:
    (a) horn means, having a contact surface in contact with one of said sheet-like members; and
    (b) anvil means, having a contact surface in contact with the other sheet-like member;

said anvil means being in confrontation with said horn means, said contact surfaces of said horn and anvil means being formed with grooves to provide a plurality of protrusions, said grooves providing a bending pattern, each of said protrusions having a flat upper surface and slanted side surfaces so that each of said protrusions has a trapezoidal shape in cross-section, said protrusions being arranged such that said grooves extend from one end to the other end of each of said contact surfaces in zig-zag fashion, said flat upper surfaces of said protrusions having an octagonal shape, said pair of sheets having fuse-bonding surfaces and at least one of said horn and anvil means providing ultrasonic vibration in a direction oblique to said fuse-bonding surfaces.

3. An ultrasonic sealing apparatus, for fuse-bonding together a pair of sheet-like members by frictional heat generated by ultrasonic vibration, comprising:
  (a) horn means, having a contact surface in contact with one of said sheet-like members; and
  (b) anvil means, having a contact surface in contact with the other sheet-like member;
  said anvil means being in confrontation with said horn means, said contact surfaces of said horn and anvil means being formed with grooves to provide a plurality of protrusions, said grooves providing a bending pattern, each of said protrusions having a flat upper surface and slanted side surfaces so that each of said protrusions has a trapezoidal shape in cross-section, said protrusions being arranged such that said grooves extend from one end to the other end of each of said contact surfaces in zig-zag fashion, said flat upper surfaces of said protrusions having a circular shape, said pair of sheets having fuse-bonding surfaces and at least one of said horn and anvil means providing ultrasonic vibration in a direction oblique to said fuse-bonding surfaces.

4. An ultrasonic sealing apparatus, for fuse-bonding a bottom portion of a thermoplastic tubular container by frictional heat generated by ultrasonic vibration, comprising:
  (a) horn means, having a contact surface in contact with said bottom portion;
  (b) anvil means, having a contact surface in contact with said bottom portion,
  said bottom portion being held between said horn and anvil means, and a position of said anvil means being displaceable relative to said horn means, said contact surfaces of said horn and anvil means being formed with grooves to provide a plurality of protrusions, said grooves providing a bending pattern, each of said protrusions having a flat upper surface and slanted side surfaces so that each of said protrusions has a trapezoidal shape in cross-section, said protrusions being arranged such that said grooves extend from one end to the other end of each of said contact surfaces in zig-zag fashion, said flat upper surfaces of said protrusions being of honeycomb configuration, said bottom portion having fuse-bonding surfaces and at least one of said horn and anvil means providing ultrasonic vibration in a direction oblique to said fuse-bonding surfaces;
  (c) conveyor means adapted to position said bottom portion between said horn and anvil means when they are opened; and
  (d) guide means adapted to flatten said bottom portion and to introduce said bottom portion into a space defined between said contact surfaces of said horn and anvil means.

5. An ultrasonic sealing apparatus, for fuse-bonding a bottom portion of a thermoplastic tubular container by frictional heat generated by ultrasonic vibration, comprising:
  (a) horn means, having a contact surface in contact with said bottom portion;
  (b) anvil means, having a contact surface in contact with said bottom portion,
  said bottom portion being held between said horn and anvil means, and a position of said anvil means being displaceable relative to said horn means, said contact surfaces of said horn and anvil means being formed with grooves to provide a plurality of protrusions, said grooves providing a bending pattern, each of said protrusions having a flat upper surface and slanted side surfaces so that each of said protrusions has a trapezoidal shape in cross-section, said protrusions being arranged such that said grooves extend from one end to the other end of each of said contact surfaces in zig-zag fashion, said flat upper surfaces of said protrusions having an octagonal shape, said bottom portion having fuse-bonding surfaces and at least one of said horn and anvil means providing ultrasonic vibration in a direction oblique to said fuse-bonding surfaces;
  (c) conveyor means adapted to position said bottom portion between said horn and anvil means when they are opened; and
  (d) guide means adapted to flatten said bottom portion and to introduce said bottom portion into a space defined between said contact surfaces of said horn and anvil means.

6. An ultrasonic sealing apparatus, for fuse-bonding a bottom portion of a thermoplastic tubular container by frictional heat generated by ultrasonic vibration, comprising:
  (a) horn means, having a contact surface in contact with said bottom portion;
  (b) anvil means, having a contact surface in contact with said bottom portion,
  said bottom portion being held between said horn and anvil means, and a position of said anvil means being displaceable relative to said horn means, said contact surfaces of said horn and anvil means being formed with grooves to provide a plurality of protrusions, said grooves providing a bending pattern, each of said protrusions having a flat upper surface and slanted side surfaces so that each of said protrusions has a trapezoidal shape in cross-section, said protrusions being arranged such that said grooves extend from one end to the other end of each of said contact surfaces in zig-zag fashion, said flat upper surfaces of said protrusions having a circular shape, said bottom portion having fuse-bonding surfaces and at least one of said horn and anvil means providing ultrasonic vibration in a direction oblique to said fuse-bonding surfaces;
  (c) conveyor means adapted to position said bottom portion between said horn and anvil means when they are opened; and
  (d) guide means adapted to flatten said bottom portion and to introduce said bottom portion into a space defined between said contact surfaces of said horn and anvil means.

* * * * *